United States Patent [19]
Reinartz et al.

[11] Patent Number: 4,819,997
[45] Date of Patent: Apr. 11, 1989

[54] SLIP-CONTROLLED BRAKE SYSTEM

[75] Inventors: Hans D. Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 142,369

[22] Filed: Jan. 11, 1988

[30] Foreign Application Priority Data

Jan. 15, 1987 [DE] Fed. Rep. of Germany ....... 3701018

[51] Int. Cl.⁴ ................................................. B60T 8/32
[52] U.S. Cl. ....................................... 303/115; 303/114
[58] Field of Search ............... 303/113, 114, 115, 119; 60/547.1, 561, 587

[56] References Cited

U.S. PATENT DOCUMENTS

| | | | |
|---|---|---|---|
| 3,677,608 | 7/1972 | Lewis | 303/114 |
| 4,395,072 | 7/1983 | Belart | 303/114 |
| 4,725,103 | 2/1988 | Watanabe | 303/114 |

FOREIGN PATENT DOCUMENTS

| | | |
|---|---|---|
| 2443545 | 3/1976 | Fed. Rep. of Germany . |
| 2928985 | 3/1984 | Fed. Rep. of Germany . |
| 3507484 | 9/1986 | Fed. Rep. of Germany . |
| 3508838 | 9/1986 | Fed. Rep. of Germany . |
| 3529503 | 2/1987 | Fed. Rep. of Germany . |
| 2086510 | 5/1982 | United Kingdom ................ 303/114 |

Primary Examiner—Andres Kashnikow
Assistant Examiner—Matthew C. Graham
Attorney, Agent, or Firm—James B. Raden

[57] ABSTRACT

A slip-controlled brake system is disclosed having a hydraulic power booster and a master cylinder arranged downstream of the power booster, wherein the pressure chamber of the power booster can be acted upon by an external pressure depending on the position of a pedal-actuatable brake valve, and wherein a fast-fill cylinder is provided which can be acted upon by the dynamic pressure and through which additional pressure fluid can be supplied to the brake circuits of the master cylinder. The fast-fill cylinder is equipped with a three-step bore wherein a piston with three shoulders is longitudinally displaceably arranged. A chamber in front of the large drive surface of the piston is connected to the dynamic brake circuit through a pressure fluid line and a chamber in front of an end face of the small step is connected to a static brake circuit through a second pressure fluid line. A first annular chamber formed between the large shoulder of the piston and the medium-sized step of the stepped bore than communicates with a second annular chamber formed between the medium-sized shoulder of the piston and the small step of the stepped bore through a pressure fluid channel and a valve. The second annular chamber is connected to a return line. In the event of a brake pressure control, additional pressure fluid flows from the chamber in front of the small step of the piston of the fast-fill cylinder into the brake circuit through the pressure fluid line. In this case, the fast-fill cylinder operates independently of the functioning of the anti-lock system.

4 Claims, 2 Drawing Sheets

SLIP-CONTROLLED BRAKE SYSTEM

BACKGROUND OF THE INVENTION

The present invention relates to a slip-controlled brake system, in particular for motor vehicles, having a hydraulic power booster and a master cylinder arranged downstream of the power booster, wherein the pressure chamber of the power booster can be acted upon by an external pressure depending on the position of a pedal-actuatable brake value, and wherein an auxiliary cylinder, for example a fast-fill cylinder, is provided which can be acted upon by the dynamic pressure and through which additional pressure fluid can be supplied to the brake circuits of the master cylinder.

Known multiple-circuit brake systems operate according to the principle of dynamic flow into a brake circuit wherein the dynamic pressure corresponds to the pressure acting upon the hydraulic booster piston. These systems suffer from the shortcoming that in the event of a failure of the circuit both the boosting effect and the braking effect of the circuit will be lost.

In addition, brake systems have already been proposed, such as that disclosed in the published German application No. P 35 07 484.1 which are provided with a pedal-actuated brake power booster which is connected to the master cylinder and which comprises a booster piston and a booster chamber, wherein an auxiliary pressure proportional to the pedal force is generated by way of a brake valve. Such brake systems are equipped with a fast-fill cylinder provided with a stepped bore wherein a two-step piston is displaceably arranged. A pressure chamber is provided in front of the large step of the two-step piston and a pressure chamber is provided in front of the small step. In this case, the pressure chamber is connected to the booster chamber and the filling chamber to the working chamber of the master cylinder. A non-return valve is inserted into a connecting line connecting the booster chamber with the pressure chamber of the fast-fill cylinder, and the control gate of the brake valve cooperates with a valve body through which the brake valve communicates with the pressure chamber. This known brake system, however, requires a relatively large installation space since the fast-fill cylinder is designed as an additional separate unit.

SUMMARY OF THE INVENTION

The object of the present invention is to provide a brake system of the type described whose fast-fill cylinder can operate on a filling volume of any size without necessitating an enlargement of its overall length or impairing its efficiency. In addition, the starting point and the termination point of the filling operation should be freely selectable. The brake system should have a particularly simple design, should operate without the necessity of complicated additional parts, and should be designed such that existing brake systems with a hydraulic booster can be retrofitted.

According to the present invention, this object is achieved by means of a fast-fill cylinder having a three-step bore, wherein a piston with three shoulders is longitudinally displaceably arranged. A chamber in front of a large drive surface is connected to the dynamic brake circuit by way of a pressure fluid line and the chamber in front of an end face of the small step is connected to a static brake circuit by way of another pressure fluid line. The first annular chamber formed between the large shoulder of the piston and the medium-sized step of the stepped bore communicates with a second annular chamber formed between a medium-sized shoulder of the piston and the small step of the stepped bore by way of a pressure fluid channel and a valve. The second annular chamber is connected to a return line.

BRIEF DESCRIPTION OF THE DRAWING

The invention will be better understood from the following Detailed Description of a Preferred Embodiment taken in conjunction with the drawings in which.

DETAILED DESCRIPTION OF A PREFERRED EMBODIMENT

Figure 1:
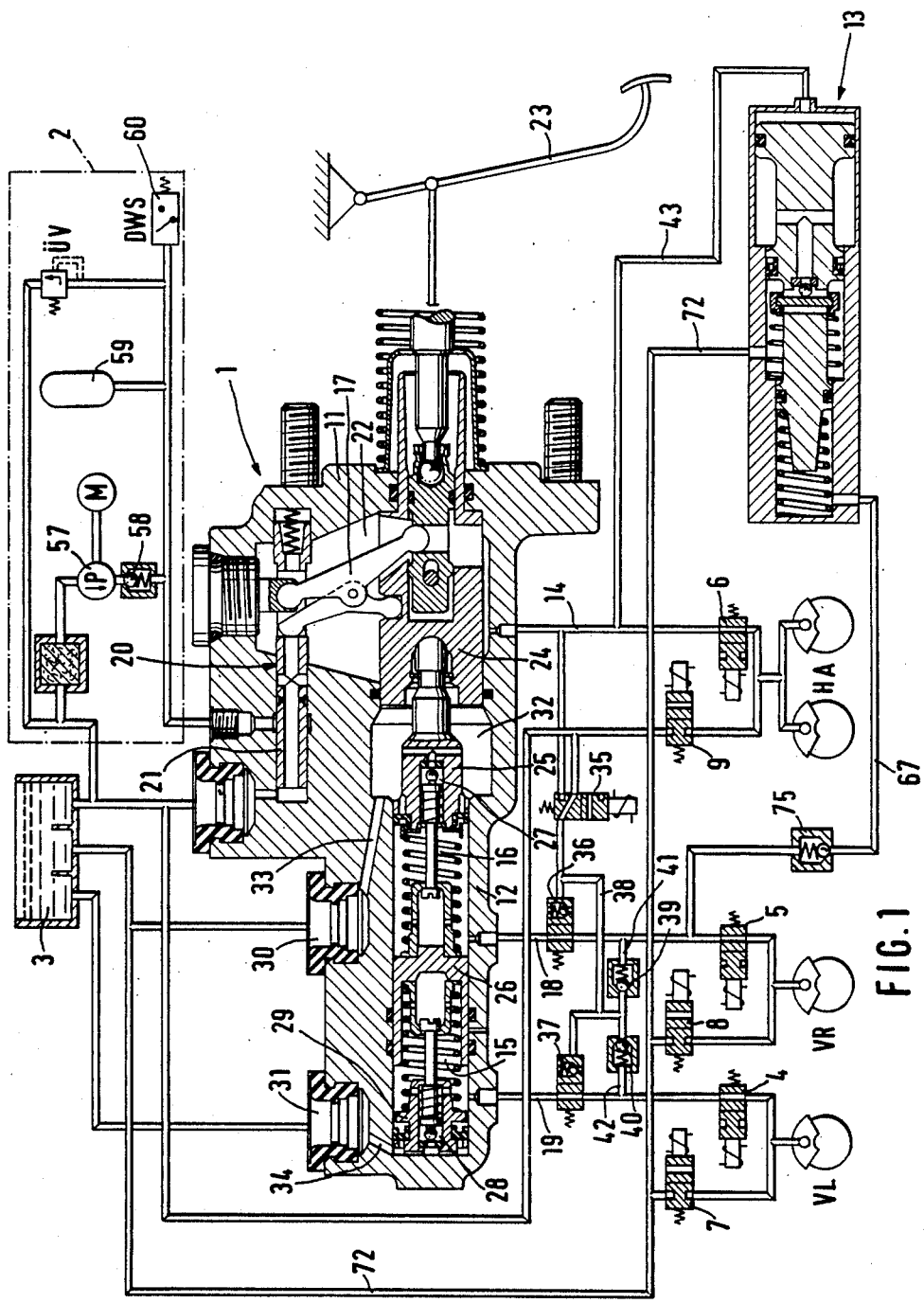
FIG. 1 is a partial cross-sectional and diagramatic view showing a slip-controlled brake system including a fast-fill cylinder.

As shown in FIG. 1, the brake systems as according to the present invention comprises, substantially, a pedal-actuated elongated hydraulic brake pressure generator which is shown generally by the reference numeral 1, an auxiliary pressure source 2, a storage and pressure compensating reservoir 3 and electromagnetically actuatable two-way/two-position valves 4, 5, 6 through which the wheel brakes of the front and the rear wheels VR, VR, HR and HL are connected to three hydraulically isolated brake circuits. Normally, that is as long as the valves 4, 5, 6 are not energized, the valves are switched so as to be open. In addition, a return line 72 leading from the front and from the rear wheel brakes VR, VL, HR, HL to the compensating reservoir 3 is provided. The return line however is isolated from the wheel brake cylinders by means of three additional two-way/two-position valves 7, 8, 9 as long as the valves 7, 8, 9 are not energized.

The brake pressure generator 1 comprises a hydraulic brake power booster 11 and a master cylinder assembly 12.

The brake power booster 11 is connected to a brake circuit, namely the rear axle brake circuit 14. The fast-fill cylinder 13 is connected into being the circuit 14 and the working chamber 16 of the master cylinder assembly 12 which is in this embodiment in the form of a tandem master cylinder, is connected with the front wheel VR by way of a separate brake circuit 18. The working chamber 15 is connected with the front wheel VL by way of a separate brake circuit 19. The master cylinder circuits 18, 19 of the arrangement are referred to as static pressure fluid circuits. The rear axle circuit 14 is a dynamic pressure fluid circuit since in this circuit 14 the pressure is determined by the position of a control valve 20 which is pedal-actuated by a lever linkage 17. The control valve permits more or less pressure, depending on the displacement of a valve piston 21, to be transmitted from the auxiliary energy source 2 into the booster chamber 22 and from there by way of the booster chamber 22 into the brake circuit 14.

The pressure which is built up in the booster chamber 22 and/or introduced through the control valve 20 when the brake pedal 23 is actuated acts simultaneously upon the booster piston 24 and through piston upon the first or push rod piston 25 of the master cylinder assembly 12 and results, as is easily understandable, in brake pressure build-up in the working chambers 15, 16 of the static brake circuits 18, 19 leading to the front wheels VR and VL. Due to the fact that the bearing piston 29 and the primary piston 25 are equipped with central valves 27, 28, a pressure fluid connection exists between the connecting pieces 30, 31 of the storage reservoir 3 and the working chambers 15, 16 of the master cylinder when the brakes are in the inoperative position. In the annular chamber 32 of the master cylinder assembly 12, which annular chamber surrounds the shaft of the piston 25, atmospheric pressure prevails since the chamber 32 is always in communication with the storage and pressure compensating reservoir through the compensating bore 33.

Hydraulically actuatable non-return valves 36, 37 which are switchable so as to enable a flow, are interposed in the brake lines 18, 19. A common control line 38 of the non-return valves is connected to the brake line 14 of the rear axle brakes by way of the master valve 35. The control line 38 is also connected with the brake lines 18, 19 of the front wheel brakes through non-return valves 39, 40 and branch lines 41, 42. Finally, the large chamber 44 of the fast-fill cylinder 13 is connected to the brake line of the rear axle brake circuit 14 through a branch line 43, and the small chamber 65 of the fast-fill cylinder 13 is connected to the brake circuit 18 of one front wheel brake VR through the branch line 67.

Figure 2:
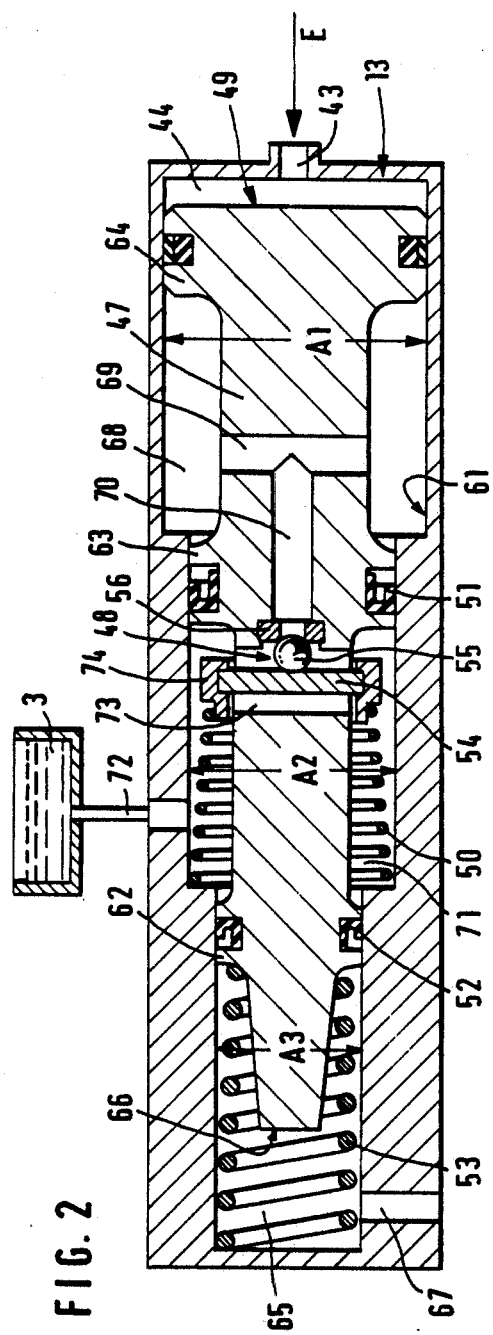
FIG. 2 is an enlarged longitudinal cross-sectional view of the fast-fill cylinder used in the system of FIG. 1 showing details of construction; and, FIG. 3 is a diagram illustrating the mode of operation of the fast-fill cylinder of FIG. 2.

Referring to FIG. 2, the fast-fill cylinder 13 comprises a piston 47 having three shoulders 62, 63, 64 and a servo valve 48. The servo valve 48 is spring force-controlled in a travel-sensitive manner.

A first annular chamber 68 is formed between a large shoulder 64 of piston 47 and the medium-sized step A2 of the stepped bore 61. The first annular chamber 68 communicates with a second annular chamber 71, which is formed between the medium-sized shoulder 63 of piston 47 and the small step A3 of the stepped bore 61, via a pressure fluid channel 69, 70 and a valve 48. The second annular chamber 71 is connected to a return line 72.

Piston 47 of the fast-fill cylinder 13 is provided with a recess 73 that is located between the small and the medium-sized step. The recess 73 extends transversely through the piston 47 and channel 69, 70 debouches into recess 73, thereby connecting the two annular chambers 68, 71. The recess 73 accommodates a transverse member 54 or thrust piece whose ends are both laterally jutting out from recess 73 and from the external contour of piston 47.

The drive surface 49 of the piston 47 is acted upon by the dynamically controlled pressure. The step A1-A2 forms the control volume for the servo valve 48. The step A3 times the piston stroke provides the filling volume. The starting point and the termination point of the filling operation are set by means of the servo spring 50. Spring 50 bears against ring 74 which in turn extends around piston 47. These points can be selected freely within the total working range of the hydraulic booster. Since the dynamic pressure in the booster always precedes the static pressure in the tandem master cylinder, the starting point of the fast-fill cylinder 13 has been chosen such that the central valves 27, 28 in the tandem master cylinder 12 are closed in any case. By this means, an outflow of the fluid volume into the reservoir 3 is prevented. Since the filling volume is required in the lower pressure range, far below the locking limit, the spring rate of the servo spring 50 is kept low.

If the fast-fill cylinder 13 is actuated, the controlled pressure acts upon the step A1. The piston 47 is moved to the left. The wheel cylinder pressure, on the other hand, acts upon the step A3 and the pressure generated by the servo valve 48 acts upon the step A1-A2. The piston 47 moves to the left (in the direction of arrow E in FIG. 2) until a balance is established. When in balance P (wheel cylinder)×A3+P (servo)×(A1-A2)=p (controlled pressure)×A1. If the servo spring 50 is further preloaded, the pressure in the annular step A1-A2 is increased.

Figure 3:
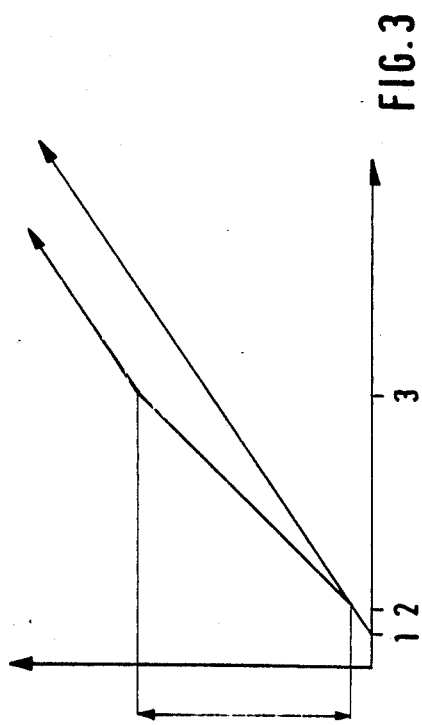

In FIG. 3, the mode of operation of the fast-fill cylinder 13 is illustrated in more detail.

At point 1, the tandem master cylinder starts to displace the volume (after the central valve 27, 28 has been closed), at point 2, the fast-fill cylinder 13 starts to fill. At point 3, the filling operation is terminated. The points 2 and 3 can be chosen freely.

If the fast-fill cylinder 13 is operated so as to assume its initial position, the balance condition is changed. Only the surfaces A1×p controlled pressure=A3×p wheel cylinder are effective. The control step A1-A2 draws volume out of the reservoir 3 by way of the cup 51. A subsequent drawing of volume out of the reservoir 3 by the wheel cylinder step is only possible through the cup 52. This is ensured by means of a non-return valve 75 installed in the line 67. When the energy supply fails during the braking action, the wheel cylinder pressure must not escape into the fast-fill cylinder. The reset of the piston 47 is effected by means of the springs 53 and 50. The servo valve 48 comprises the spring 50, the thrust piece 54, the ball and/or the closing member 55 as well as the valve set 56.

According to FIG. 1, one single fast-fill cylinder 13 with different strokes for the push rod piston and the floating circuit piston can be provided. Two fast-fill cylinders 13 can, however, also be provided, but are not illustrated in more detail.

An advantage of the separate fast-fill cylinder 13 is found in that first, the overall length of the tandem master cylinder 12 plus booster 11 is not increased; second; the efficiency of the total unit is not impaired by the fast-fill step normally required; and third, the fast-fill step must not be entrained by the pedal in the event of a failure of the energy supply. The fast-fill cylinder 13 only operates when the energy supply is ensured.

A sensor, such as an inductive transducer, is provided at each wheel VL, VR, HL, HR of the vehicle equipped with the brake system according to the invention which feeds information about the rotating behavior of the wheel into an electronic controller (not depicted in more detail). The controller comprises, among other things, an electronic logic operation circuit in the form of wired or programmable switching circuits, such as microprocessors, and generates, upon evaluation of the sensor signals, control commands which are available at the outlets of the controller (not depicted) and which are further transmitted to the corresponding solenoid valves 4, 5, 6, 7, 8, 9 and 24 by way of signalling lines which are also not shown.

When the brake slip control starts, the master valve 35 is switched over. Thereby, a pressure fluid line leading from the booster chamber 22 by way of the control and/or branch lines 38, 41, 42 to the brake circuits 18, 19 is released, thus allowing a pressure fluid to flow to the wheel brakes VL, VR.

Due to the dynamic introduction of pressure fluid from the booster chamber 22 into the static brake circuit 18, 19 of the front wheels VR, VL, a discharge of pressure fluid through the central valves 27 and 28, which have been switched over, and thus an "empty control" of the working chambers 15, 16 is precluded even in the event of frequent pressure reductions since the master valve 35 and the valves 36, 37 are switched over simultaneously. Pressure fluid can thus flow back into the brake circuits 18, 19 but not into the reservoir 3.

In the event that a defect occurs in the auxiliary energy supply system 2 which includes a pressure fluid pump 57 associated non-return valve 58 and a pressure fluid accumulator 59, the pressure warning circuit (DWS) 60 responds, transmits this information to the electronic controller of the brake system and causes, depending on the amount of the residual pressure, a cut-off of the brake slip control.

What is claimed is:

1. A slip-controlled brake sytem, in particular for motor vehicles, comprising a hydraulic power booster and a master cylinder arranged downstream of the power booster, wherein a pressure chamber of the power booster is acted upon by an external pressure depending on the position of a pedal-actuatable brake valve, an auxiliary cylinder, comprising a fast-fill cylinder connected to a dynamic brake circuit and acted upon by the dynamic pressure, said fast-fill cylinder connected to a static brake circuit and supplying pressure fluid to the static brake circuits of the master cylinder, said fast-fill cylinder including a three-step bore, wherein a piston with three shoulders is longitudinally displaceably arranged, a first chamber in front of a large drive surface of the piston is connected to the dynamic brake circuit through a pressure fluid line and a second chamber in front of an end face of a small step is connected to a static brake circuit through another pressure fluid line, a first annular chamber formed between a large shoulder of the piston and a medium-sized step of the stepped bore communicates with a second annular chamber formed between the medium-sized shoulder of the piston and the small step of the stepped bore through a pressure fluid channel and a control valve, said second annular chamber is connected to a return line.

2. The slip-controlled brake system according to claim 1 wherein a valve closing member of the control valve governs the pressure fluid flow from the annular chamber of the large step to the annular chamber of the medium-sized step, said closing member acted upon by a closing spring, said closing spring bears, on a first end, against the housing of the fast-fill cylinder and, on a second end, bears against a traverse member defining a thrust piece abutting on the closing member.

3. The slip-controlled brake system according to claim 2 wherein the piston of the fast-fill is provided with a recess in the bore between the small and the medium-sized step, said recess extending transversely through the piston, the channel connecting the two annular chambers extending into the recess, the recess accommodating the transverse thrust piece, said thrust piece having ends laterally jutting out from the recess and from the external contour of the piston, a ring engaging around the piston, the closing spring bearing against the ring and abutting on both ends of the transverse member so that the transverse member acts upon the closing body of the control valve in a direction of closure of the control valve.

4. The slip-controlled brake system according to claim 3 wherein the medium-sized shoulder of the piston of the fast-fill cylinder is sealed relative to the medium-sized step of the stepped bore by a cup engaging around the piston, the cup permitting a supply flow of pressure fluid from the second annular chamber into the first annular chamber during a filling stroke and preventing a return flow from the first annular chamber into the second annular chamber.

* * * * *